US010076773B2

(12) United States Patent
Takahashi et al.

(10) Patent No.: US 10,076,773 B2
(45) Date of Patent: Sep. 18, 2018

(54) METHOD FOR WASHING REACTOR

(75) Inventors: Shinya Takahashi, Tokyo (JP);
Kazuhiko Tasaka, Tokyo (JP); Yuichi Tanaka, Tokyo (JP); Marie Iwama, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 74 days.

(21) Appl. No.: 13/817,218

(22) PCT Filed: Aug. 12, 2011

(86) PCT No.: PCT/JP2011/068477
§ 371 (c)(1),
(2), (4) Date: Feb. 15, 2013

(87) PCT Pub. No.: WO2012/023526
PCT Pub. Date: Feb. 23, 2012

(65) Prior Publication Data
US 2013/0146088 A1 Jun. 13, 2013

(30) Foreign Application Priority Data
Aug. 19, 2010 (JP) .................... 2010-184183

(51) Int. Cl.
B08B 3/08 (2006.01)
B08B 3/10 (2006.01)
(Continued)

(52) U.S. Cl.
CPC ............... *B08B 3/04* (2013.01); *B01J 38/52* (2013.01); *B01J 38/56* (2013.01); *B08B 9/08* (2013.01);
(Continued)

(58) Field of Classification Search
CPC ..... B08B 9/08; B08B 3/04; C10G 2300/4031; C10G 2/32; C10G 47/36; C10G 1/06;
(Continued)

(56) References Cited

U.S. PATENT DOCUMENTS 2,434,537 A * 1/1948 Barr .................. C07C 1/0485
518/706
2,487,867 A * 11/1949 Griffin, Jr. ............... B01J 23/94
502/31
(Continued)

FOREIGN PATENT DOCUMENTS

AU 2009299341 4/2010
CA 2738126 4/2010
(Continued)

OTHER PUBLICATIONS

Search report from International Application No. PCT/JP2011/068477, dated Nov. 15, 2011.
(Continued)

*Primary Examiner* — Douglas Lee
(74) *Attorney, Agent, or Firm* — Greenblum & Bernstein, P.L.C.

(57) ABSTRACT

The method for cleaning a reactor of the present invention comprises passing a solvent through a wax-fraction hydrocracking apparatus which is charged with a catalyst and to which supply of a wax fraction is stopped, wherein the solvent comprising at least one oil selected from a group
(Continued)

consisting of hydrocarbon and vegetable oils, and having a sulfur content of less than 5 ppm and being in a liquid state at 15° C.

13 Claims, 3 Drawing Sheets

(51) Int. Cl.
| | | |
|---|---|---|
| *B08B 9/08* | (2006.01) | |
| *B08B 3/04* | (2006.01) | |
| *C10G 1/06* | (2006.01) | |
| *C10G 47/22* | (2006.01) | |
| *C10G 47/00* | (2006.01) | |
| *C10G 21/12* | (2006.01) | |
| *C10G 47/36* | (2006.01) | |
| *C10G 2/00* | (2006.01) | |
| *B01J 38/52* | (2006.01) | |
| *B01J 38/56* | (2006.01) | |

(52) U.S. Cl.
CPC .............. *C10G 1/06* (2013.01); *C10G 2/32* (2013.01); *C10G 21/12* (2013.01); *C10G 47/00* (2013.01); *C10G 47/22* (2013.01); *C10G 47/36* (2013.01); *C10G 2300/1014* (2013.01); *C10G 2300/1022* (2013.01); *C10G 2300/4031* (2013.01); *C10G 2300/44* (2013.01); *Y02P 30/20* (2015.11)

(58) Field of Classification Search
CPC ............ C10G 21/12; C10G 2300/1014; C10G 2300/1022; C10G 2300/44; C10G 47/00; C10G 47/22; B01J 38/52; B01J 38/56; Y02P 30/20
USPC .......................... 134/10, 18, 22.19; 510/188
See application file for complete search history.

(56) References Cited

U.S. PATENT DOCUMENTS

| | | | | | |
|---|---|---|---|---|---|
| 6,068,760 | A * | 5/2000 | Benham | ................ | C10G 2/342 208/950 |
| 7,393,876 | B2 * | 7/2008 | White | .................... | B01J 23/002 518/713 |
| 8,685,212 | B2 * | 4/2014 | Tanaka | .................... | C10G 2/32 203/87 |
| 2003/0144128 | A1 * | 7/2003 | Daage | .................... | B01J 23/94 502/23 |
| 2004/0180974 | A1 * | 9/2004 | Espinoza | ................ | C01B 3/382 518/726 |
| 2005/0035027 | A1 | 2/2005 | Beech et al. | | |
| 2005/0112767 | A1 * | 5/2005 | Eagan | ................ | G01N 21/0332 436/55 |
| 2010/0282328 | A1 * | 11/2010 | Nakashizu | ............... | C10G 2/30 137/2 |
| 2011/0049011 | A1 * | 3/2011 | Tanaka | ................... | C10G 47/00 208/85 |

FOREIGN PATENT DOCUMENTS

| | | | | |
|---|---|---|---|---|
| EP | 1 953 208 | | 8/2008 | |
| JP | 06-212172 | | 8/1994 | |
| JP | 2000-1680 | | 1/2000 | |
| JP | 2001-170590 | | 6/2001 | |
| JP | 2001170590 | A * | 6/2001 | |
| JP | 2003-320333 | | 11/2003 | |
| JP | 2003-320334 | | 11/2003 | |
| JP | 2003320333 | A * | 11/2003 | |
| JP | 2004-323626 | | 11/2004 | |
| JP | 2005-272671 | | 10/2005 | |
| JP | 2007-204506 | | 8/2007 | |
| JP | WO 2009113574 | A1 * | 9/2009 | ............. C10G 47/00 |
| JP | WO 2010038389 | A1 * | 4/2010 | ............... C10G 2/32 |
| WO | 03/038012 | | 5/2003 | |
| WO | 2010/038399 | | 4/2010 | |
| WO | WO 2010038389 | A1 * | 4/2010 | ............... C10G 2/32 |

OTHER PUBLICATIONS

International Preliminary Report on Patentability Application No. PCT/JP2011/068477, dated Mar. 28, 2013.

Extended European Search Report issued with respect to EP Patent Application No. 11818168.4, dated Jul. 2, 2014.

Canadian Office Action issued with respect to application No. 2806283, dated Sep. 22, 2016.

* cited by examiner

Prior Art

METHOD FOR WASHING REACTOR

TECHNICAL FIELD

The present invention relates to a method for cleaning a reactor and more particularly to a method for cleaning a hydrocracking apparatus.

BACKGROUND ART

Recently, in view of a reduction of an environment load, an environment friendly and clean liquid fuel having a low sulfur content and a low aromatic hydrocarbon content has been desired. In view of this, as a technique for producing a fuel-oil base free of a sulfur content or aromatic hydrocarbons and rich in an aliphatic hydrocarbon, in particular, a kerosene/light-oil base, a method of using the Fischer-Tropsch synthesis reaction (hereinafter, sometimes referred to as "FT synthesis reaction") employing carbon monoxide and hydrogen as raw materials has been studied (see, for example, Patent Literature 1).

A synthetic oil (crude oil) obtained by the FT synthesis reaction (hereinafter, sometimes referred to as "FT synthetic oil") is a mixture containing aliphatic hydrocarbons having a wide carbon-atom distribution as main components. From the FT synthetic oil, it is possible to obtain a naphtha fraction rich in a component having a boiling point lower than about 150° C., a middle fraction rich in a component having a boiling point from about 150° C. to about 360° C. and a wax fraction (hereinafter, sometimes referred to as "FT wax fraction") containing a heavier hydrocarbon component than the middle fraction (having a boiling point exceeding about 360° C.). Of these fractions, the middle fraction, which is the most useful fraction corresponding to a kerosene/light-oil base, is desirably obtained in a high yield. Therefore, in an upgrading step for obtaining a fuel-oil base from the FT synthetic oil, the yield of the middle fraction is increased as a whole by converting the FT wax fraction, which is produced together with the middle fraction in an FT synthesis reaction step in a considerable amount, into a component corresponding to a middle fraction by reducing the molecular weight by hydrocracking.

The FT wax fraction obtained from the FT synthetic oil by fractionation is hydrocracked in a wax fraction hydrocracking step and then separated into a gas and a liquid in a gas liquid separation step. The liquid component (hydrocarbon oil) obtained herein is fed to a rectifying tower downstream, together with a middle fraction, which is previously fractionated from the FT synthetic oil and separately hydrorefined, and fractionated therein to obtain a middle fraction (kerosene/light oil fraction). At this time, from the bottom of the rectifying tower, a heavy component (bottom oil), which mainly contains a so-called undecomposed wax which has not been hydrocracked in such a level to have a boiling point in the range for a middle-fraction, in a wax fraction hydrocracking step, is recovered. The whole amount of bottom oil is recycled by resupplying it together with a wax fraction from an FT synthesis reaction step to a wax fraction hydrocracking step and hydrocracking it again (see, for example, Patent Literature 2).

A technique for producing a hydrocarbon oil such as the aforementioned liquid fuel is known as a GTL (gas-to-liquid) process, in which a synthetic gas containing carbon monoxide gas and hydrogen gas as major components is produced from a gaseous hydrocarbon such as a naturally occurring gas used as a raw material in accordance with a reforming reaction and then the hydrocarbon oil is produced by using the synthetic gas as a raw material for the FT synthesis reaction.

CITATION LIST

Patent Literature

Patent Literature 1: Japanese Patent Application Laid-Open Publication No. 2004-323626
Patent Literature 2: Japanese Patent Application Laid-Open Publication No. 2007-204506

SUMMARY OF INVENTION

Technical Problem

In a plant for producing a hydrocarbon oil such as fuel oil in accordance with the aforementioned method, a catalyst is taken out from a reactor when an operation is stopped and exchanged with a new catalyst or subjected to regeneration. During the time when operation of the reactor is stopped, usually, a reaction fluid remaining in the reactor is purged with, for example, nitrogen gas; however, the fluid partly remains in e.g., the spaces between catalyst particles charged in the reactor. In a wax-fraction hydrocracking apparatus, an oil containing a wax fraction remains in the spaces between hydrocracking catalyst particles charged in a reactor. Since catalyst particles have been cooled to about normal temperature at the time of taking out the catalyst, a wax fraction is solidified to fix catalyst particles to each other, rendering it difficult to take out catalyst particles. This is a problem.

Usually, in regenerating the catalyst taken out, first a deoiling treatment is performed for removing an oil by heating the catalyst having the oil attached thereto under an atmosphere such as nitrogen gas to evaporate the oil. However, it is difficult to sufficiently remove the oil by the deoiling treatment since the wax fraction is rarely evaporated from the hydrocracking catalyst having the oil containing a wax fraction attached thereto. When the catalyst from which oil is insufficiently removed is heated in the air for regeneration, the remaining oil catches fire, excessively increasing temperature. As a result, an active metal aggregates, decreasing the activity thereof.

The present invention was made in the aforementioned circumstances and is directed to providing a method for cleaning a reactor capable of facilitating taking out of a catalyst from a wax-fraction hydrocracking apparatus and regeneration of the catalyst.

Solution to Problem

To solve the aforementioned problems, the present invention provides a method for cleaning a reactor comprising passing a solvent through a wax-fraction hydrocracking apparatus which is charged with a catalyst and to which supply of a wax fraction is stopped, wherein the solvent comprising at least one oil selected from a group consisting of hydrocarbon and vegetable oils, and having a sulfur content of less than 5 ppm and being in a liquid state at 15° C.

In the present invention, the wax fraction refers to a fraction containing a fraction having a boiling point of beyond 360° C. in a content of 80 mass % or more based on the total mass of the fraction and normal paraffin in a content of 70 mass % or more. Furthermore, the sulfur content refers to a sulfur concentration (mass ppm), which is the concentration of the all sulfur compounds contained in a solvent and expressed in sulfur atom equivalent. Note that the sulfur compounds include sulfur, an inorganic sulfur compound and an organic sulfur compound.

According to the method for cleaning a reactor of the present invention, a wax fraction present in the surface and the periphery of a catalyst can be removed by passing the aforementioned specific solvent through a hydrocracking apparatus which is charged with a catalyst and to which supply of the wax fraction is stopped. In this manner, the catalyst can be easily taken out from the hydrocracking apparatus and regenerated while preventing excessive temperature increase caused by ignition of the remaining oil during catalyst regeneration. Furthermore, since the sulfur content of the solvent is less than 5 ppm, it is possible to sufficiently prevent the sulfur content from remaining in a flow channel for a hydrocracking reaction product, etc., and an adverse effect upon the catalyst to be regenerated. Moreover, since the solvent is in a liquid state at 15° C., the presence or absence of deposition of a wax can be visually checked by cooling the solvent discharged from the wax-fraction hydrocracking apparatus. By virtue of this, the presence or absence of a wax fraction in the solvent used for cleaning, in other words, the presence or absence of the remaining wax fraction within the wax-fraction hydrocracking apparatus is checked, and thus, whether or not the cleaning step is terminated can be easily determined.

In the method for cleaning a reactor of the present invention, it is preferable to take a check-up sample from the solvent discharged from the wax-fraction hydrocracking apparatus; to check the presence or absence of deposition of the wax in the check-up sample at a predetermined temperature; and to continue the feed of the solvent if the deposition of the wax is confirmed and terminate the feed of the solvent if deposition of the wax is not confirmed.

Note that the aforementioned predetermined temperature can be appropriately set such that the concentration of the wax in the solvent is confirmed to decrease to a desired level based on the previously obtained relationship between the concentration of a wax in a solvent, which differs depending upon the type of solvent to be used, and the temperature at which the wax starts depositing. In this manner, it is possible to easily check whether the wax fraction of the wax-fraction hydrocracking apparatus is sufficiently removed.

In the method for cleaning a reactor of the present invention, cleaning can be realized without fail in a short time and with a small amount of solvent used by setting the aforementioned predetermined temperature so as to fall within the range of −20° C. to 40° C.

Furthermore, in the method for cleaning a reactor of the present invention, it is preferred that the solvent is passed through the wax-fraction hydrocracking apparatus, then fractionated in a rectifying tower arranged downstream of the wax-fraction hydrocracking apparatus, and again passed through the wax-fraction hydrocracking apparatus. In this case, the amount of solvent used can be drastically reduced. Furthermore, in the rectifying tower, the wax fraction can be separated from the solvent used in cleaning.

In the method for cleaning a reactor of the present invention, it is preferred that the solvent is a hydrocarbon produced in a GTL process. In this case, if the method for cleaning a reactor of the present invention is applied to a reactor in the GTL process, it is possible to prevent occurrence of problems such as contamination of a product with the solvent used in cleaning.

In the present invention, the GTL process refers to a process comprising producing a synthetic gas containing carbon monoxide gas and hydrogen gas as major components from a gaseous hydrocarbon used as a raw material in accordance with a reforming reaction, producing a liquid hydrocarbon by using the synthetic gas as a raw material for FT synthesis reaction, and further producing various hydrocarbon oils such as fuel oil from the liquid hydrocarbon.

Further, it is preferred that the solvent is a light oil fraction produced by the GTL process. In this case, the problem of product contamination can be prevented and recovery and reutilization of the used solvent are facilitated.

Advantageous Effects of Invention

According to the present invention, it is possible to provide a method for cleaning a reactor, capable of facilitating taking out a catalyst from a wax-fraction hydrocracking apparatus and regeneration of a catalyst.

DESCRIPTION OF EMBODIMENTS

Figure 1:
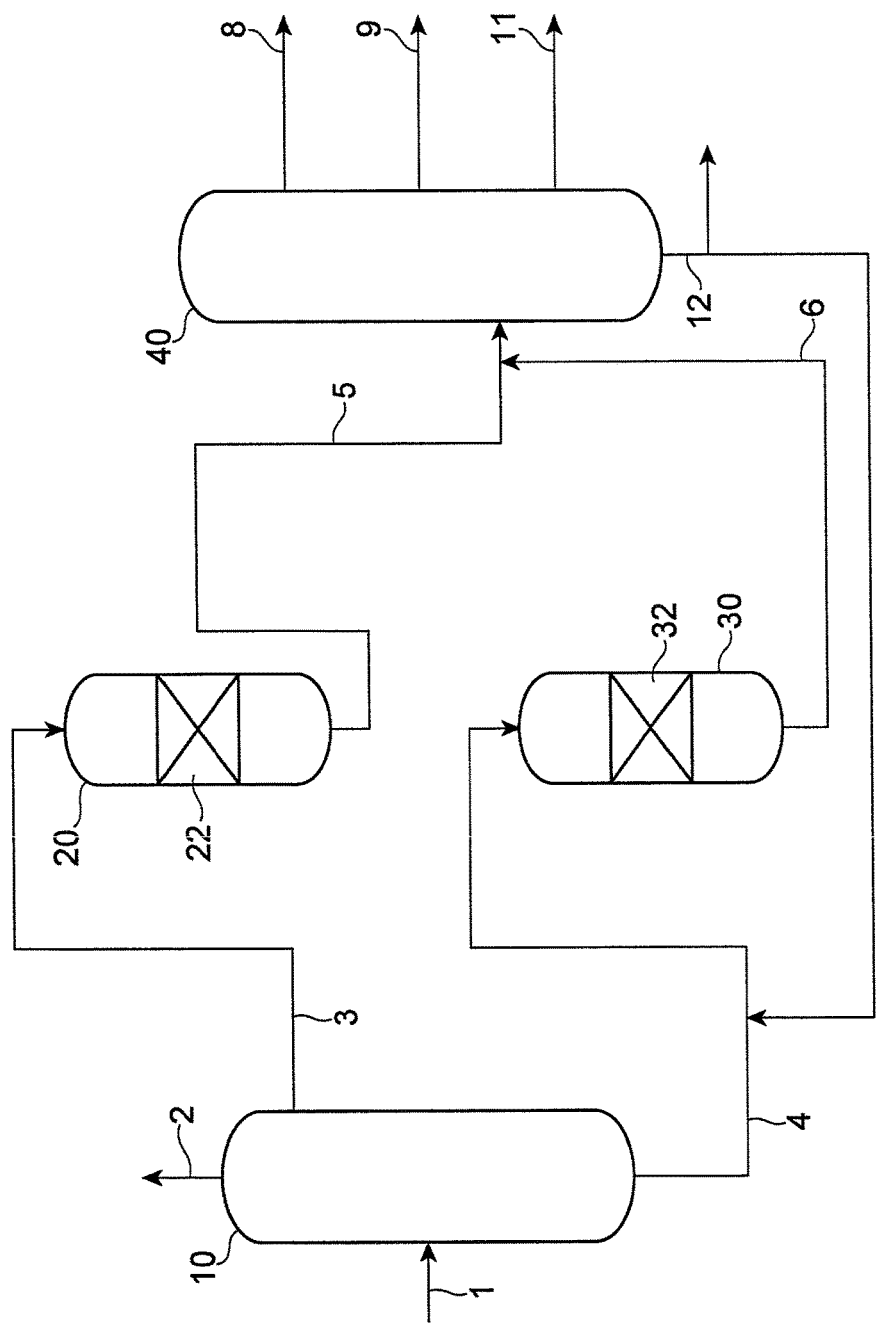
FIG. 1 is a schematic configuration diagram showing an apparatus for producing a hydrocarbon oil.

The method for cleaning a reactor of the present invention can be applied to an apparatus for use in producing a hydrocarbon oil. Before the cleaning method according to the present invention is described, production of a hydrocarbon oil and an apparatus for producing a hydrocarbon will be described. FIG. 1 is a schematic configuration diagram showing an apparatus for producing a hydrocarbon oil. A production apparatus 100 shown in FIG. 1 mainly constitutes a part of the upgrading step of the GTL process.

The hydrocarbon oil production apparatus 100 comprises a first rectifying tower 10 configured to fractionate the FT synthetic oil, which is supplied from an FT synthesis reactor by way of a line 1, into a naphtha fraction, a middle fraction and a wax fraction; a middle-fraction hydrorefining apparatus 20 configured to hydrorefine and hydroisomerize the middle fraction supplied by a line 3; a wax-fraction hydrocracking apparatus 30 configured to hydrocrack the wax fraction supplied by a line 4. The naphtha fraction is supplied to a naphtha fraction hydrorefining apparatus (not shown in the figure) by way of a line 2. The middle-fraction hydrorefining apparatus 20 is charged with a hydrorefining catalyst 22 and the wax-fraction hydrocracking apparatus 30 is charged with a hydrocracking catalyst 32. The hydrocarbon oil production apparatus 100 further comprises a second rectifying tower 40, to which oil discharged from the middle-fraction hydrorefining apparatus 20 is supplied by way of a line 5 and a hydrocracked product from the wax-fraction hydrocracking apparatus 30 is supplied by way of a line 6, in which the mixture of these is fractionated, downstream of the middle-fraction hydrorefining apparatus 20 and the wax-fraction hydrocracking apparatus 30. The second rectifying tower 40 is provided with lines 8, 9, 11 and 12 each for taking out a fractionated fraction.

Next, an example of producing a hydrocarbon oil (hereinafter, sometimes referred to as "the production example") by the hydrocarbon oil production apparatus 100 will be described.

FT synthetic oil used in the production example is not particularly limited as long as it is synthesized by an FT synthesis method; however, in view of enhancing a yield of the middle fraction, it preferably contains a hydrocarbon having a boiling point of about 150° C. or more in an amount of 80 mass % or more based on the total mass of the FT synthetic oil. Furthermore, the FT synthetic oil, which is usually produced by a known FT synthesis reaction method, is a mixture containing aliphatic hydrocarbons having a wide carbon-atom distribution as a main component; however, the FT synthetic oil may be a fraction obtained by appropriately fractionating the mixture in advance.

The naphtha fraction is a component distilled at a temperature lower than about 150° C. in the first rectifying tower 10. The middle fraction is a component distilled at a temperature from about 150° C. to about 360° C. at the first rectifying tower 10. The wax fraction is a component which is not distilled at about 360° C. in the first rectifying tower 10 and taken out from the bottom of the tower. Note that, in the specification, a case where two cut points (i.e., about 150° C. and about 360° C.) are set in the first rectifying tower 10 to obtain three fractions is shown as a preferable embodiment; however, for example, one cut point may be set to obtain the fraction of the cut point or less, which is introduced as a middle fraction into the middle-fraction hydrorefining apparatus 20 by way of the line 3, and the fraction beyond the cut point, which is taken out as a wax fraction by way of the line 4.

In the naphtha fraction hydrorefining apparatus (not shown in the figure), a naphtha fraction is hydrorefined by a known method, whereas an olefin, which is a by-product of an FT synthesis reaction and contained in the naphtha fraction, is converted into a saturated hydrocarbon. In contrast, an oxygen-containing compound, such as an alcohol containing an oxygen atom derived from carbon monoxide, is converted into a hydrocarbon and water.

In the middle-fraction hydrorefining apparatus 20, an olefin and an oxygen-containing compound contained in the middle fraction are converted into a saturated hydrocarbon by a known method, in the same manner as in the naphtha fraction hydrorefining apparatus. At the same time, in the case where a fuel-oil base is obtained as a product oil, in order to improve low-temperature properties (low-temperature flowability) thereof, at least part of normal paraffin contained in the middle fraction is hydroisomerized and converted into isoparaffin.

The type of the middle-fraction hydrorefining apparatus 20 is not limited; however, it is preferably a fixed-bed circulation reactor. The reactor may be constituted of a single unit or a plurality of units arranged in-line or in parallel. Furthermore, a catalyst bed provided in the reactor may be formed of a single unit or partitioned into a plurality of parts.

As the catalyst to be charged in the middle-fraction hydrorefining apparatus 20, a catalyst generally used in hydrorefinement and/or hydroisomerization during petroleum refinement or the like, more specifically, a catalyst prepared by attaching an active metal having hydrogenation (-dehydrogenation) ability to an inorganic carrier, can be used. As the active metal constituting the catalyst, at least one type of metal selected from the group consisting of metals belonging to the Groups 6, 8, 9 and 10 of the Periodic Table of elements, is used. Specific examples of these metals include a noble metal such as platinum, palladium, rhodium, ruthenium, iridium and osmium, and cobalt, nickel, molybdenum, tungsten and iron; preferably platinum, palladium, nickel, cobalt, molybdenum and tungsten; and further preferably platinum and palladium. Furthermore, it is preferred that these metals are used in a combination of a plurality of types of metals. In this case, examples of a preferable combination thereof include platinum-palladium, cobalt-molybdenum, nickel-molybdenum, nickel-cobalt-molybdenum and nickel-tungsten. Note that the Periodic Table of elements herein refers to the Periodic Table of long-period type elements based on the definition by the IUPAC (the International Union of Pure and Applied Chemistry.)

Examples of the inorganic carrier constituting a catalyst as mentioned above include a metal oxide such as alumina, silica, titania, zirconia and boria. These metal oxides may be used alone or as a mixture of two or more or a metal oxide complex such as silica alumina, silica zirconia, alumina zirconia and alumina boria. The inorganic carrier is, in view of efficiently performing hydroisomerization of normal paraffin simultaneously with hydrorefinement, preferably a metal oxide complex being acidic as a solid substance, such as silica alumina, silica zirconia, alumina zirconia and alumina boria. Furthermore, the inorganic carrier may contain a small amount of zeolite. Moreover, the inorganic carrier may contain a binder in order to improve moldability and mechanical strength of the carrier. Examples of a preferable binder include alumina, silica and magnesia.

The content of an active metal in the catalyst, in the case where the active metal is a noble metal as mentioned above, is preferable about 0.1 to 3 mass % in terms of metal atom based on the mass of the carrier. Furthermore, in the case where the active metal is a metal other than the aforementioned noble metals, the content is preferably about 2 to 50 mass % in terms of metal oxide based on the mass of the carrier. If the content of an active metal is less than the lower limit value, hydrorefinement and hydroisomerization are unlikely to proceed sufficiently. In contrast, if the content of an active metal exceeds the upper limit value, dispersion of the active metal reduces, with the result that activity of the catalyst is likely to reduce, increasing catalyst cost.

In the production example, the reaction temperature in the middle-fraction hydrorefining apparatus 20 is for example, 180 to 400° C., preferably 280 to 350° C. and further preferably 300 to 340° C. The reaction temperature herein refers to an average temperature of the catalyst layer in the middle-fraction hydrorefining apparatus 20. If the reaction temperature is the lower-limit temperature or more, the middle fraction is sufficiently hydrorefined and hydroisomerized. If the reaction temperature is the upper-limit temperature or less, a decomposition reaction of the middle fraction can be prevented from simultaneously occurring as well as a catalyst life can be prevented from reducing.

The pressure (hydrogen partial pressure) of the middle-fraction hydrorefining apparatus 20 is, for example, 0.5 to 12 MPa, preferably 1 to 5 MPa. If the pressure of the hydrorefining apparatus is 0.5 MPa or more, a crude middle fraction is sufficiently hydrorefined and hydroisomerized. If the pressure is 12 MPa or less, equipment cost for increasing the pressure resistance of equipment can be suppressed.

The liquid hourly space velocity (LHSV) of the middle-fraction hydrorefining apparatus 20 is, for example, 0.1 to 10 $h^{-1}$ and preferably 0.3 to 3.5 $h^{-1}$. If LHSV is 0.1 $h^{-1}$ or more, it is not necessary to excessively enlarge the volume of a reactor. If LHSV is 10 $h^{-1}$ or less, the middle fraction is efficiently hydrorefined and hydroisomerized.

The hydrogen gas/oil ratio of the middle-fraction hydrorefining apparatus 20 is, for example, 50 to 1000 NL/L and preferably 70 to 800 NL. The "NL" herein refers to a hydrogen volume (L) in the normal conditions (0° C., 101325 Pa). If the hydrogen gas/oil ratio is 50 NL/L or more, the middle fraction is sufficiently hydrorefined and hydroisomerized. If the ratio is 1000 NL/L or less, equipment for supplying a large amount of hydrogen gas is not required and an increase of operation cost can be suppressed.

In the middle-fraction hydrorefining apparatus 20 as mentioned above, the hydrorefining apparatus 20 is preferably operated such that an olefin and an oxygen-containing compound contained in the middle fraction are completely converted into a saturated hydrocarbon; at the same time, the kerosene fraction and light oil fraction obtained from the second rectifying tower 40 satisfy desired low-temperature properties (cold flow property).

In the wax-fraction hydrocracking apparatus 30, a wax fraction is hydrocracked by a known method using a hydrocracking catalyst and converted into a component corresponding to the middle fraction. At this time, an oxygen-containing compound, such as an olefin and an alcohol, contained in the wax fraction is converted into paraffin. Furthermore, in the case where a fuel-oil base is simultaneously obtained as a product oil, hydroisomerization of normal paraffin, which contributes to improvement of low-temperature properties (cold flow property) of the product oil as a fuel-oil base, also proceeds.

Meantime, a part of the wax fraction is excessively hydrocracked and converted into a hydrocarbon corresponding to a naphtha fraction, which has a further lower boiling point than the boiling point range of a hydrocarbon corresponding to a desired middle fraction. Furthermore, hydrocracking of the part further proceeds and the part is converted into a gaseous hydrocarbon having 4 or less carbon atoms such as butanes, a propane, an ethane and a methane.

The type of the wax-fraction hydrocracking apparatus 30 is not limited; however, it is preferably a fixed-bed circulation reactor. The reactor may be constituted of a single unit or a plurality of units arranged in-line or in parallel. Furthermore, a catalyst bed provided in the reactor may be formed of a single unit or partitioned into a plurality of parts.

Examples of the hydrocracking catalyst to be used in the wax-fraction hydrocracking apparatus 30 include a catalyst prepared by attaching a metal belonging to the Groups 8 to 10 of the Periodic Table of elements as an active metal to a carrier containing a solid acid. Examples of a preferable carrier include a crystalline zeolite such as an ultra stable Y-type (USY) zeolite, Y-type zeolite, mordenite and β zeolite, and a carrier containing at least one type of solid acid selected from heat-resistant amorphous metal oxide complexes such as silica alumina, silica zirconia and alumina boria. Furthermore, the carrier is more preferably constituted of USY zeolite and at least one solid acid selected from silica alumina, alumina boria and silica zirconia.

USY zeolite is an ultra-stabilized zeolite obtained by subjecting Y-type zeolite to a hydrothermal treatment and/or an acid treatment and has pores having a size within the range of 2 to 10 nm newly formed in addition to a micropore structure called micro pores having 2 nm or less in size that Y zeolite originally has. The average particle size of USY zeolite is not particularly limited; however, it is preferably 1.0 µm or less and more preferably 0.5 µm or less. Furthermore, in USY zeolite, the molar ratio of silica/alumina (the molar ratio of silica relative to alumina) is preferably 10 to 200, more preferably 15 to 100 and further preferably 20 to 60.

Furthermore, the carrier is preferably constituted of crystalline zeolite in an amount of 0.1 to 80 mass % and a heat-resistant amorphous metal oxide complex in an amount of 0.1 to 60 mass %.

A carrier can be produced by molding a carrier composition containing the solid acid and a binder, followed by calcining. The blending ratio of the solid acid is preferably 1 to 70 mass % based on the whole amount of carrier and more preferably 2 to 60 mass %. Furthermore, in the case where a carrier is constituted of USY zeolite, the blending ratio of the USY zeolite is preferably 0.1 to 10 mass % based on the mass of the whole carrier and more preferably 0.5 to 5 mass %. Furthermore, in the case where a carrier is constituted of USY zeolite and alumina boria, the blending ratio of USY zeolite and alumina boria (USY zeolite/alumina boria) is preferably 0.03 to 1 by mass. Furthermore, in the case where a carrier is constituted of USY zeolite and silica alumina, the blending ratio of USY zeolite and silica alumina (USY zeolite/silica alumina) is preferably 0.03 to 1 by mass.

The binder is not particularly limited; however, alumina, silica, titania and magnesia are preferable and alumina is more preferable. The content of the binder is preferably 20 to 98 mass % based on the mass of the whole carrier and more preferably 30 to 96 mass %.

The calcining temperature of a carrier composition as mentioned above preferably falls within the range of 400 to 550° C., more preferably within the range of 470 to 530° C. and further preferably within the range of 490 to 530° C.

Specific examples of a metal belonging to the Groups 8 to 10 of the Periodic Table of elements include cobalt, nickel, rhodium, palladium, iridium and platinum. Of these, it is preferred that metals selected from nickel, palladium and platinum are used singly or in combination of two types or more. These metals can be attached to a carrier as mentioned above by a conventional method such as impregnation and ion exchange. The amount of metal to be attached is not particularly limited; however, the total amount of metal is preferably 0.1 to 3.0 mass % relative to the carrier mass.

The hydrogen partial pressure in the wax-fraction hydrocracking apparatus 30 is, for example, 0.5 to 12 MPa and preferably 1.0 to 5.0 MPa.

The liquid hourly space velocity (LHSV) of the wax-fraction hydrocracking apparatus 30 is, for example, 0.1 to 10.0 h$^{-1}$ and preferably 0.3 to 3.5 h$^{-1}$. The ratio of hydrogen gas and a wax fraction (the hydrogen gas/oil ratio) is not particularly limited; however, for example, the ratio is 50 to 1000 NL/L and preferably 70 to 800 NL/L. Note that "LHSV (liquid hourly space velocity)" herein refers to a volumetric flow rate of a wax fraction in normal conditions (25° C., 101325 Pa) per volume of a layer (catalyst layer) consisting of a catalyst charged in a fixed-bed circulation reactor. The unit "h$^{-1}$" is an inverse number of hours. Furthermore, "NL", which is a unit of hydrogen volume in the hydrogen gas/oil ratio, refers to hydrogen volume (L) in normal conditions (0° C., 101325 Pa).

Furthermore, the reaction temperature (weight average temperature of a catalyst bed) in the wax-fraction hydrocracking apparatus 30 is, for example, 180 to 400° C., preferably 200 to 370° C., more preferably 250 to 350° C. and further preferably 280 to 350° C. When the reaction temperature exceeds 400° C., hydrocracking excessively proceeds and the yield of a desired middle fraction tends to reduce. Furthermore, a hydrocracked product is colored and use of this as a fuel base is sometimes restricted. In contrast, in the case where the reaction temperature is lower than 180° C., hydrocracking of a wax fraction does not sufficiently proceed and the yield of the middle fraction tends to reduce. In addition, an oxygen-containing compound such as alcohols in the wax fraction tends not to be sufficiently removed. Note that the reaction temperature is controlled by controlling the preset temperature of the outlet of a heat exchanger provided, for example, to the line 4.

In the wax-fraction hydrocracking apparatus 30 as mentioned above, the wax-fraction hydrocracking apparatus 30 is preferably operated such that the content of a specific hydrocarbon component contained in a hydrocracked product, more specifically, the content of a hydrocarbon component having a boiling point of 25° C. or more and 360° C. or less is preferably 20 to 90 mass % based on the mass of the whole hydrocracked product having a boiling point of 25° C. or more, more preferably 30 to 80 mass % and further preferably 45 to 70 mass %. If the content of the specific hydrocarbon component falls within the range mentioned above, the rate of progression of hydrocracking is appropriate and the yield of the middle fraction can be enhanced. Note that the hydrocracked product herein refers to all products including undecomposed wax and a light hydrocarbon produced by excessive hydrocracking.

The hydrocracked product obtained from the wax-fraction hydrocracking apparatus 30 is introduced into a gas liquid separation apparatus (not shown in the figure) and separated into a gas component and a liquid component. Thereafter, the liquid component is fed by way of the line 6 and mixed with the oil discharged from the middle-fraction hydrorefining apparatus 20 and supplied by way of the line 5 and then supplied to the second rectifying tower 40. In contrast, the gas component separated in the gas liquid separation apparatus, which contains hydrogen gas containing a gaseous hydrocarbon generated by excessive hydrocracking of a wax fraction as a main component, is supplied to the middle-fraction hydrorefining apparatus 20 or the naphtha fraction hydrorefining apparatus and can be reused as hydrogen for a hydrogenation reaction.

Furthermore, the gas liquid separation apparatus mentioned above can be provided in multi stages. In this case, if a stepwise cooling method is employed, a trouble such as clogging of the apparatus 30, which is caused by solidification of a component (particularly, undecomposed wax) having a high solidification point and contained in a hydrocracked product supplied from the apparatus 30 by rapid cooling, can be prevented.

Note that the oil discharged from the middle-fraction hydrorefining apparatus 20 and supplied by way of the line 5 and the liquid component of the hydrocracked product supplied by way of the line 6 may be mixed in the manner of either one of line blend and tank blend.

In the second rectifying tower 40, a plurality of cut points are set depending upon the hydrocarbon oil to be taken out, distillation of a mixture of the oil discharged from the middle-fraction hydrorefining apparatus 20 and the hydrocracked product discharged from the wax-fraction hydrocracking apparatus 30 is performed. In the production example, cut points are set to, for example, 150° C., 250° C., 360° C. In this way, a naphtha fraction (GTL naphtha) is taken out by way of the line 8, a kerosene fraction (GTL kerosene) is taken out by way of the line 9, a light oil fraction (GTL light oil) is taken out by way of the line 11 and bottom oil containing undecomposed wax as a main component is taken out by way of the line 12. The whole amount of bottom oil taken out is recycled to the wax-fraction hydrocracking apparatus 30 and subjected again to hydrocracking.

Next, the case where the method for cleaning a reactor of the present invention is applied to the aforementioned hydrocarbon oil production apparatus will be described.

Figure 2:
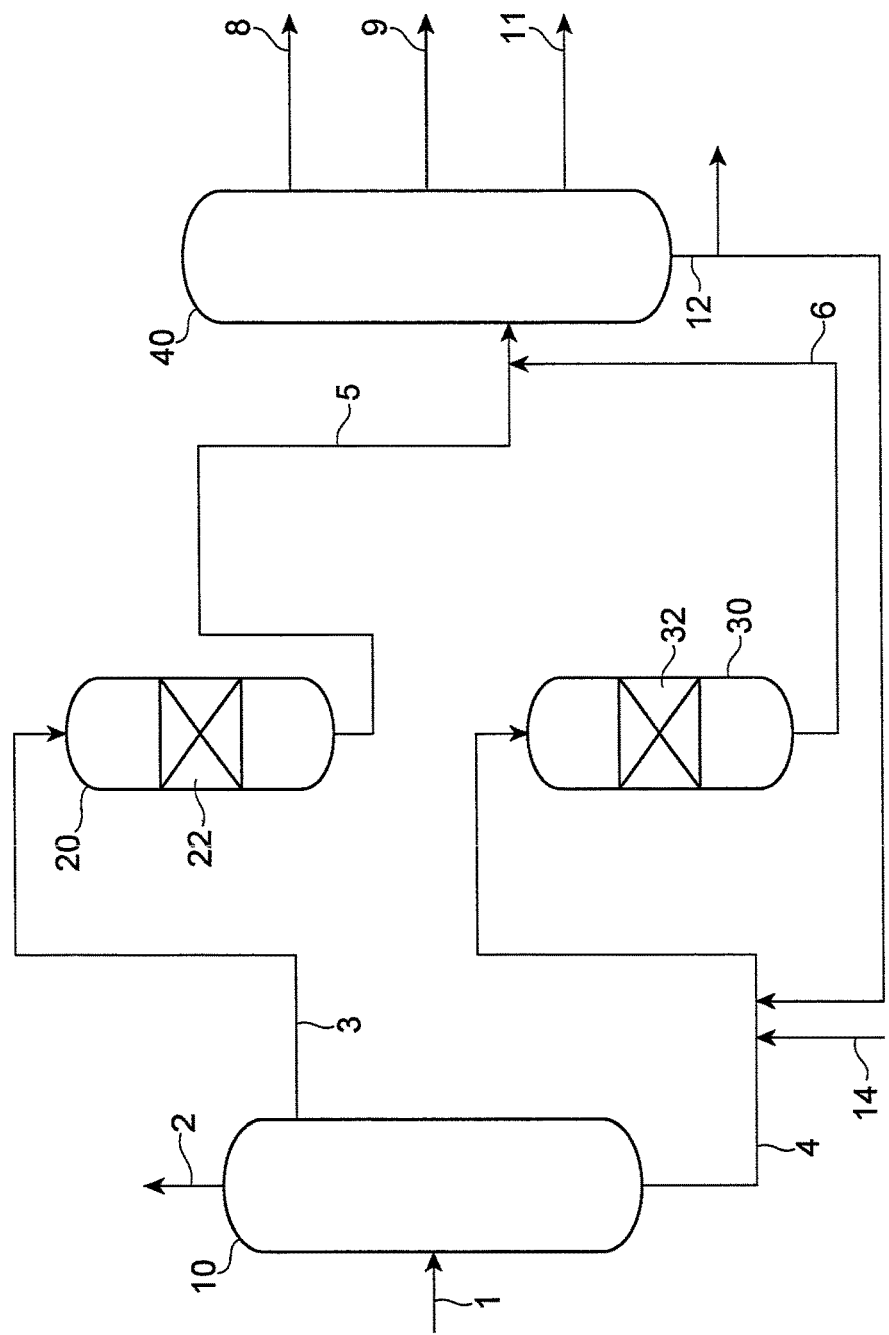
FIG. 2 is a schematic configuration diagram showing an apparatus for producing a hydrocarbon oil to which the method for cleaning a reactor of the present invention is applied.

FIG. 2 is a schematic configuration diagram showing an apparatus for producing a hydrocarbon oil to which the method for cleaning a reactor of the present invention is applied. A hydrocarbon oil production apparatus 110 shown in FIG. 2 has the same structure as that of the hydrocarbon oil production apparatus 100 shown in FIG. 1 except that a line 14 for supplying a solvent comprising at least one oil selected from a group consisting of hydrocarbon and vegetable oils, and having a sulfur content of less than 5 ppm and being in a liquid state at 15° C. to the line 4 is further provided in the hydrocarbon oil production apparatus 100.

In the hydrocarbon oil production apparatus 110, the solvent according to the present invention supplied from the line 14 to the line 4 is supplied to the wax-fraction hydrocracking apparatus 30 to carry out the method for cleaning a reactor according to the present invention.

Examples of the solvent comprising at least one oil selected from a group consisting of hydrocarbon and vegetable oils, and having a sulfur content of less than 5 ppm and being in a liquid state at 15° C. used in the embodiment include a hydrocarbon oil produced by a GTL process, such as GTL light oil, GTL kerosene, GTL naphtha, petroleum-derived low-sulfur light oil having an externally-introduced sulfur content of 5 ppm or less, vegetable oil and a mixture of these. GTL light oil, GTL kerosene and GTL naphtha may be GTL light oil, GTL kerosene and GTL naphtha refined by hydrogenation or the corresponding fractions, i.e., crude GTL light oil, crude GTL kerosene and crude GTL naphtha which are not hydrorefined. Examples of the vegetable oil include rapeseed oil and soybean oil. Of these, hydrorefined GTL light oil, GTL kerosene and GTL naphtha are preferred and hydrorefined GTL light oil is more preferable, for the reasons that the solubilities of a wax fraction to them is high; a component other than a hydrocarbon, an aromatic hydrocarbon and a naphthene hydrocarbon are not substantially contained; there is no possibility of contamination of a GTL product; and the solvent is available in the same plant.

An embodiment according to the method for cleaning a reactor of the present invention will be described by way of the case where a refined GTL light oil is used as a cleaning solvent to be applied to the production apparatus 110 shown in FIG. 2.

First, in the production apparatus 110, supply of a wax fraction from the bottom of the first distillation tower 10 to the wax-fraction hydrocracking apparatus 30 is stopped. Also, recycling of the bottom oil of the second rectifying tower 40 to the wax-fraction hydrocracking apparatus 30 is stopped. Supply of hydrogen gas used in hydrocracking may be continued or stopped. Furthermore, operation of the middle-fraction hydrorefining apparatus 20 may be stopped or continued.

Subsequently, GTL light oil serving as a cleaning solvent is supplied from the line 14 and fed by way of the line 4 to the wax-fraction hydrocracking apparatus 30. As the GTL light oil, the GTL light oil stored in the same plant can be supplied. The supply temperature of the cleaning solvent is controlled by a heat exchanger for heating (not shown in the figure) provided to the line 4. The temperature, which is at least 280° C. or less and preferably 250° C. or less, is controlled to be the temperature (for example, 120° C. or more) at which a wax fraction flows. When the cleaning solvent is supplied, the remaining wax fraction within the wax-fraction hydrocracking apparatus 30 is removed.

The cleaning solvent containing a wax fraction discharged from the wax-fraction hydrocracking apparatus 30 is fed to the second rectifying tower 40 by way of the line 6. At this time, the temperature of the cleaning solvent containing a wax fraction to be supplied to the second rectifying tower 40 is controlled by a heat exchanger (not shown in the figure) provided for heating downstream of a site at which the line 6 and the line 5 are merged. The temperature is controlled such that the temperature of the bottom of the second rectifying tower 40 is lower than 280° C. and reaches a temperature (for example, 120° C. or more) at which a wax fraction flows. By controlling the temperature of the bottom of the second rectifying tower as mentioned above, GTL light oil serving as a cleaning solvent in the second rectifying tower flows down to the bottom together with a wax fraction contained in the cleaning solvent without being gasified or distilled.

Note that, in the embodiment, since GTL light oil is used as a cleaning solvent, it is possible to allow the cleaning solvent to easily flow down in the second rectifying tower 40 toward the bottom and to be taken out from the bottom.

From the bottom of the second rectifying tower 40, a mixture of the GTL light oil (including the middle fraction when operation of the middle-fraction hydrorefining apparatus 20 is continued and the oil discharged from the apparatus is supplied to the second rectifying tower 40) serving as a cleaning solvent and the wax fraction removed from the wax-fraction hydrocracking apparatus 30 is taken out from the bottom of the second rectifying tower 40 by way of the line 12 and fed to a slop tank.

In the embodiment, it is preferred that, in the middle of the solvent-cleaning, a check-up sample is appropriately taken out from the solvent used in cleaning by way of the line 6 and cooled to a predetermined temperature, and then, the presence or absence of deposition of a wax is preferably checked visually and continuation/termination of cleaning is checked.

The aforementioned predetermined temperature herein can be appropriately set such that the concentration of the wax in each solvent is confirmed to decrease to a desired level based on the previously obtained relationship between the concentration of a wax in a solvent, which differs depending upon the type of solvent to be used, and the temperature at which the wax starts depositing. In this manner, it is possible to easily check whether the wax fraction in the wax-fraction hydrocracking apparatus is sufficiently removed. The predetermined temperature is preferably −20 to 40° C., more preferably 0 to 35° C. and further more preferably 10 to 30° C. and preferably set to a temperature at which the solvent to be used for solvent-cleaning is present in a liquid state, more specifically, a temperature of not less than a flow point of the solvent (measured by the method according to JIS K2269). In the case where the predetermined temperature is lower than −20° C., a cleaning solvent is solidified depending upon the type thereof. In this case, it is sometimes difficult to determine the presence or absence of deposition of a wax and a specific apparatus is further required for cooling. In contrast, in the case where the predetermined temperature exceeds 40° C., the solubility of a wax fraction to a solvent excessively increases, and it tends to be difficult to check the presence of a wax in a solvent. Furthermore, the predetermined temperature can be set to near room temperature, for example, 15° C. The temperature of 15° C. is the lowest temperature for all cleaning solvents according to the present invention to maintain a liquid state. Therefore, a wax is most likely to deposit at 15° C. of all temperatures which can be applied to all cleaning solvents without exception. In other words, a residual wax is most strictly checked up at 15° C.

In the aforementioned predetermined temperature, if deposition of a wax in a check-up sample is confirmed, it is determined that the wax fraction remains in the wax-fraction hydrocracking apparatus 30. Then solvent-cleaning is further continued. In contrast, if deposition of a wax in a check-up sample is not confirmed, it is determined that a wax fraction in the wax-fraction hydrocracking apparatus 30 has been removed and solvent-cleaning is terminated.

In the embodiment, when termination of solvent-cleaning is determined, supply of GTL light oil serving as a cleaning solvent to the wax-fraction hydrocracking apparatus 30 is stopped to terminate solvent-cleaning.

As described above, whether solvent-cleaning should be continued or terminated can be determined by a check-up sample. In this manner, it is possible to determine that the wax fraction is sufficiently removed from the wax-fraction hydrocracking apparatus 30 and a problem possibly caused by insufficient removal of the wax fraction can be prevented. Furthermore, solvent-cleaning needs not be continued excessively for a long time and the amount of solvent to be used can be reduced to the minimum amount required, with the result that cleaning can be efficiently performed.

In the embodiment, a reactor can be shut down by using the method for cleaning a reactor according to the present invention.

First, feedback of a wax fraction to the wax-fraction hydrocracking apparatus 30 and feedback of the bottom oil of the second rectifying tower for recycle use are stopped, and then solvent-cleaning according to the aforementioned embodiment is performed. In this manner, remaining wax fraction in the wax-fraction hydrocracking apparatus 30 can be sufficiently removed. Then, the system of the wax-fraction hydrocracking apparatus 30 is purged. Purge refers to discharging a cleaning solvent such as GTL light oil remaining in the system usually with an inert gas such as nitrogen gas, outside the system. After the purge, the wax-fraction hydrocracking apparatus 30 is opened to the atmosphere and an operation for taking out a catalyst and the like is performed.

The catalyst taken out can be regenerated by a known method. More specifically, the catalyst taken out is heated under an inert gas atmosphere such as a nitrogen gas atmosphere, for example, to about 200 to 500° C. to remove the cleaning solvent, i.e., GTL light oil attached to the catalyst. Following the deoiling treatment, the deoiled catalyst is heated preferably under an air atmosphere, for example, to about 300 to 600° C., to remove a carbonaceous substance deposited on the catalyst. In this manner, the catalyst is regenerated. The catalyst taken out from the reactor cleaned by the method for cleaning a reactor of the present invention is sufficiently free of a wax fraction and an oil can be sufficiently removed by the deoiling treatment. Therefore, ignition of an oil is suppressed in a heating treatment performed in the air, and activity reduction caused by aggregation of an active metal due to excessive temperature increase can be prevented.

Furthermore, another embodiment of the method for cleaning a reactor of the present invention will be described. In the cleaning method of the embodiment, after the solvent according to the present invention is passed through a wax-fraction hydrocracking apparatus, the solvent is fractionated in a rectifying tower arranged downstream of the wax-fraction hydrocracking apparatus and again passed through the wax-fraction hydrocracking apparatus.

In the embodiment in which a cleaning solvent is recycled, the amount of solvent used can be further reduced, compared to the aforementioned embodiment where the cleaning solvent is not recycled. In addition, a GTL product can be recovered simultaneously with cleaning.

In the embodiment, hydrocarbon oils produced by a GTL process and refined, such as refined GTL light oil, GTL kerosene, GTL naphtha and a mixture thereof, are preferably used, since they produce no problem even if a product is contaminated with them. Of these, GTL light oil is more preferably used since a used solvent can be easily recovered and reused. Now, the cleaning method of the embodiment will be described by way of the case where refined GTL light oil is used.

Figure 3:
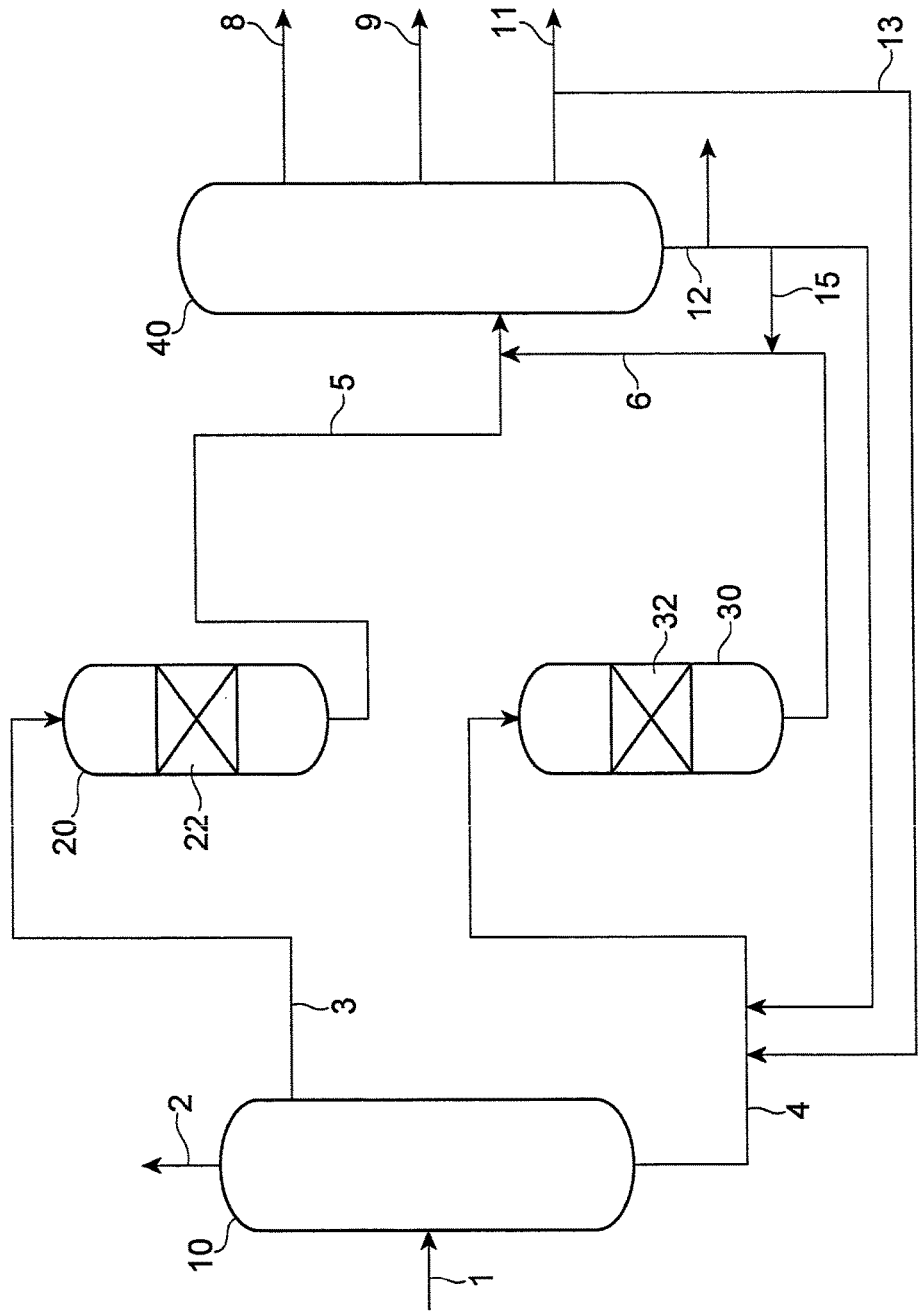
FIG. 3 is a schematic configuration diagram showing another apparatus for producing a hydrocarbon oil to which the method for cleaning a reactor of the present invention is applied.

FIG. 3 is a schematic configuration diagram showing another apparatus for producing a hydrocarbon oil to which the cleaning method according to the embodiment is applied. A hydrocarbon oil production apparatus 120 shown in FIG. 3 has the same structure as that of the hydrocarbon oil production apparatus 100 shown in FIG. 1 except that a line 13 is further provided for supplying a fraction obtained from the rectifying tower 40 to the line 4.

First, in the production apparatus 120, supply of a wax fraction from the bottom of the first rectifying tower 10 to the wax-fraction hydrocracking apparatus 30 is stopped. Furthermore, recycling of a wax fraction of the bottom oil of the second rectifying tower 40 to the wax-fraction hydrocracking apparatus 30 is also stopped. Supply of hydrogen gas used in hydrocracking may be continued or stopped. Furthermore, operation of the middle-fraction hydrorefining apparatus 20 may be stopped or continued.

Subsequently, at least part of the GTL light oil fraction taken out from the line 11 connected to the second rectifying tower 40 is fed to the wax-fraction hydrocracking apparatus 30 by way of the line 13 and the line 4. The supply temperature of a cleaning solvent is controlled by a heat exchanger (not shown in the figure) for heating provided to the line 4. The temperature, which is 280° C. or less as the minimum requirement and preferably 250° C. or less, is controlled to be the temperature at which a wax fraction flows (for example, 120° C. or more). The wax fraction remaining in the wax-fraction hydrocracking apparatus 30 is removed by supplying the cleaning solvent.

The cleaning solvent containing the wax fraction discharged from the wax-fraction hydrocracking apparatus 30 is fed to the second rectifying tower 40 by way of the line 6. At this time, the temperature of the cleaning solvent containing the wax fraction to be supplied to the second rectifying tower 40 is controlled by a heat exchanger (not shown in the figure) provided downstream of a site at which the line 6 and the line 5 are merged. The temperature is preferably controlled to be the same as the temperature (for example, about 310° C.) of the hydrocarbon oil to be supplied to the second rectifying tower 40 at the normal operation time of the hydrocarbon oil production apparatus 100.

From the bottom of the second rectifying tower 40, bottom oil containing a wax fraction as a main component discharged from the wax-fraction hydrocracking apparatus 30 by cleaning is taken out. The bottom oil taken out is heated together with GTL light oil, which is a cleaning solvent containing a wax fraction discharged from the wax-fraction hydrocracking apparatus 30 by a line 15 connecting between the line 12 and the line 6, by the heat exchanger and fed back to the second rectifying tower 40 for recycle use. In this case, the wax fraction is locally recycled around the second rectifying tower 40 without being discharged outside. Such recycling is performed in order to keep a heavy bottom oil required for distilling a GTL light oil fraction (and a lighter fraction than the GTL light oil fraction) in the second rectifying tower 40.

The GTL light oil fraction used for cleaning is taken out from the line 11 connected to the second rectifying tower 40. At least part of the GTL light oil fraction taken out is fed back to the wax-fraction hydrocracking apparatus 30 by way of the line 13 and reused for cleaning the apparatus.

In the case where the middle-fraction hydrorefining apparatus 20 is operated simultaneously with cleaning of the wax-fraction hydrocracking apparatus 30, the oil supplied and discharged from the apparatus 30 is fed to the second rectifying tower 40 and fractionated therein. By the fractionation, the GTL light oil derived from a cleaning solvent discharged from the wax-fraction hydrocracking apparatus 30 is distilled together with the GTL light oil fraction derived from the oil discharged from the middle-fraction hydrorefining apparatus 20 from the line 11. In the embodiment, a GTL kerosene fraction is distilled from the line 9, and a GTL naphtha fraction is distilled from the line 8. Part of the GTL light oil fraction as well as the GTL kerosene fraction and GTL naphtha fraction from the line 11 can be recovered as a product.

In the embodiment, in the case where a solvent other than GTL products refined as a cleaning solvent is used, there is a high possibility of contamination with a component not contained in a general GTL product, such as an oxygen-containing compound, an aromatic hydrocarbon and a naphthene hydrocarbon. Thus, in the case where cleaning of a reactor is performed simultaneously with recovery of a GTL product, a GTL product refined as a cleaning solvent, in particular, GTL light oil, is preferably used.

Also in this embodiment, as is the same as explanation in the previous embodiment, it is preferred that termination of cleaning is determined based on the presence or absence of deposition of a wax by appropriately taking out a check-up sample from the solvent used in cleaning flowing in line 6 in the middle of solvent-cleaning. Also in this embodiment, the same effect as in the previous embodiment is exerted. More specifically, if no deposition of a wax is confirmed in a check-up sample and termination of cleaning is determined, cleaning can be terminated by stopping recycling of GTL light oil serving as a cleaning solvent to the wax-fraction hydrocracking apparatus 30. In this manner, cleaning can be efficiently performed without continuing solvent-cleaning excessively for a long time.

Furthermore, also in this embodiment, as is the same in the previous embodiment, shut down of a reactor can be performed by use of the method for cleaning a reactor according to the present invention.

First, feedback of a wax fraction to the wax-fraction hydrocracking apparatus 30 and feedback of the bottom oil of the second rectifying tower for recycle use are stopped, and then solvent-cleaning according to the aforementioned embodiment is performed. In this manner, the remaining wax fraction in the wax-fraction hydrocracking apparatus 30 can be sufficiently removed. Then, the system of the wax-fraction hydrocracking apparatus 30 is purged. Purge refers to discharging a cleaning solvent such as GTL light oil remaining in the system usually with an inert gas such as nitrogen gas, outside the system. After the purge, the wax-fraction hydrocracking apparatus 30 is opened to the atmosphere and an operation for taking out a catalyst and the like is performed.

The remaining wax fraction in the second rectifying tower 40 can be discharged from the line 12 to a slop tank together with minimum GTL light oil fraction required for discharging the wax fraction.

Also in this embodiment, the effects of easily taking out a catalyst and suppressing a reduction in activity of the catalyst by excessive temperature increase during regeneration of the catalyst taken out are exerted by the method for cleaning a reactor of the present invention and can be obtained as is the same in the previous embodiment.

Furthermore, in this embodiment, the amount of the cleaning solvent to be used can be drastically reduced compared to the previous embodiment. More specifically, since a cleaning solvent is recycled by recovering it by fractionation and removing a wax fraction, the amount of the solvent used can be drastically reduced without reducing a cleaning effect. The yield ratio of a GTL product can be increased by the reduction. Furthermore, a reduction of industrial waste is resulted.

The present invention is not limited to the aforementioned embodiments and can be modified within the range of the gist of the present invention. For example, in the above embodiment, a light oil fraction is taken out from the second rectifying tower 40 by way of the line 11 and a kerosene fraction is taken out by way of the line 9; however, these can be taken out as a single fraction (middle fraction) and this middle fraction may be used as a cleaning solvent.

According to the method for cleaning a reactor and the shutdown method for the reactor of the present invention mentioned above, it is possible to easily take out a catalyst from the wax-fraction hydrocracking apparatus. Furthermore, when the catalyst taken out is regenerated, the temperature during the regeneration treatment can be easily controlled and activity reduction of the catalyst can be suppressed.

REFERENCE SIGNS LIST

10 . . . First rectifying tower, 20 . . . Middle-fraction hydrorefining apparatus, 22 . . . Hydrorefining catalyst, 30 . . . Wax-fraction hydrocracking apparatus, 32 . . . Hydrocracking catalyst, 40 . . . Second rectifying tower, 100 . . . Hydrocarbon oil production apparatus.

The invention claimed is:

1. A method for regenerating a catalyst, to which wax and oil are attached, comprising:
   stopping the supply of a wax fraction through a fixed-bed flow reactor charged with a catalyst for hydrocracking a wax fraction;
   passing a solvent comprising at least one oil selected from the group consisting of hydrocarbon and vegetable oils, wherein the oil has a sulfur content of less than 5 ppm and is in a liquid state at 15° C., through a fixed-bed flow reactor charged with the catalyst for hydrocracking the wax fraction, said wax fraction being dissolved in the solvent;
   picking a check-up sample from the solvent discharged from the fixed-bed flow reactor;
   visually checking, at a temperature at or below the temperature at which the wax deposits from the solvent with a desired level of wax concentration, for the presence or absence of wax deposition in the check-up sample;
   continuing the passage of the solvent through the fixed-bed flow reactor if wax deposition is present in the check-up sample, but discontinuing the passage of the solvent through the fixed-bed flow reactor if wax deposition is absent in the check-up sample;
   discharging the catalyst from the reactor when wax deposition is absent in the check-up sample and the flow passage of the solvent through the reactor is stopped; and
   removing oil on the catalyst discharged from the fixed-bed flow reactor after the wax fraction present on and around the catalyst is removed by the solvent, by heating the catalyst under an inert gas atmosphere to evaporate the oil an obtain a deoiled catalyst.

2. The method according to claim 1, wherein the solvent passed through the fixed-bed flow reactor is then fractionated in a rectifying tower positioned downstream of the fixed-bed flow reactor, and again passed through the fixed-bed flow reactor prior to said discontinuing of the passage of the solvent through the fixed-bed flow reactor.

3. The method according to claim 1, wherein the solvent is a hydrocarbon produced by a GTL process.

4. The method according to claim 1, wherein the solvent is a light oil fraction produced by a GTL process.

5. The method according to claim 1, wherein the temperature at or below the temperature at which the wax deposits from the solvent with a desired level of wax concentration is between −20° C. to 40° C.

6. The method according to claim 1, wherein the inert gas atmosphere comprises nitrogen gas.

7. The method according to claim 6, wherein the deoiled catalyst is heated under an air atmosphere to obtain a regenerated catalyst.

8. A method for regenerating a catalyst, to which wax and oil are attached, comprising:
   stopping the supply of a wax fraction through a fixed-bed flow reactor charged with a catalyst for hydrocracking a wax fraction;
   passing a solvent comprising at least one oil selected from the group consisting of hydrocarbon and vegetable oils, wherein the oil has a sulfur content of less than 5 ppm and is in a liquid state at 15° C., through a fixed-bed flow reactor charged with the catalyst for hydrocracking the wax fraction, said wax fraction being dissolved in the solvent;
   picking a check-up sample from the solvent discharged from the fixed-bed flow reactor;
   checking, at a temperature at or below the temperature at which the wax deposits from the solvent with a desired level of wax concentration, for the presence or absence of wax deposition in the check-up sample;
   continuing the passage of the solvent through the fixed-bed flow reactor if wax deposition is present in the check-up sample, but discontinuing the passage of the solvent through the fixed-bed flow reactor if wax deposition is absent in the check-up sample;
   discharging the catalyst from the reactor when wax deposition is absent in the check-up sample and the flow passage of the solvent through the reactor is stopped; and
   removing oil on the catalyst discharged from the fixed-bed flow reactor after the wax fraction present on and around the catalyst is removed by the solvent, by heating the catalyst under an inert gas atmosphere in order to evaporate the oil and obtain a deoiled catalyst, wherein the temperature is set such that the concentration of the wax in the solvent is confirmed to be decreasing, between each pass-through of the solvent, to a desired level based on a previously obtained relationship between the concentration of the wax in the solvent and a temperature at which the wax starts depositing.

9. The method according to claim 8, wherein the solvent passed through the fixed-bed flow reactor is then fractionated in a rectifying tower positioned downstream of the fixed-bed flow reactor, and again passed through the fixed-bed flow reactor prior to said discontinuing of the passage of the solvent through the fixed-bed flow reactor.

10. The method according to claim 8, wherein the solvent is a hydrocarbon produced by a GTL process.

11. The method according to claim 8, wherein the temperature at or below the temperature at which the wax deposits from the solvent with a desired level of wax concentration is between −20° C. to 40° C.

12. The method according to claim 8, wherein the inert gas atmosphere comprises nitrogen gas.

13. The method according to claim 12, wherein the deoiled catalyst is heated under an air atmosphere to obtain a regenerated catalyst.

\* \* \* \* \*

UNITED STATES PATENT AND TRADEMARK OFFICE
CERTIFICATE OF CORRECTION

PATENT NO.       : 10,076,773 B2
APPLICATION NO.  : 13/817218
DATED            : September 18, 2018
INVENTOR(S)      : S. Takahashi et al.

It is certified that error appears in the above-identified patent and that said Letters Patent is hereby corrected as shown below:

In the Claims

Column 16, Line 11 (Claim 1), please change "oil an obtain" to -- oil and obtain --

Signed and Sealed this
Sixteenth Day of April, 2019

Andrei Iancu
*Director of the United States Patent and Trademark Office*